United States Patent

Kihara

[15] 3,678,217

[45] July 18, 1972

[54] WITHDRAWING A MAGNETIC RECORDING TAPE FROM A CASSETTE AND ENGAGING A LOOP FORMED IN THE TAPE WITH THE GUIDE DRUM OF A MAGNETIC RECORDING AND/OR REPRODUCING APPARATUS

[72] Inventor: Nobutoshi Kihara, Tokyo, Japan

[73] Assignee: Sony Corporation, Tokyo, Japan

[22] Filed: May 15, 1970

[21] Appl. No.: 37,623

[30] Foreign Application Priority Data

Sept. 22, 1969 Japan....................................44/75721
Sept. 22, 1969 Japan....................................44/75720
Sept. 22, 1969 Japan....................................44/90629

[52] U.S. Cl. ....................179/100.2 T, 179/100.2 Z, 226/91
[51] Int. Cl.....................................G11b 15/66, G11b 23/04
[58] Field of Search............................179/100.2 T, 100.2 Z; 178/6.6 A, 6.6 P; 226/91

[56] References Cited

UNITED STATES PATENTS 3,474,195 10/1969 Wada..............................179/100.2 T
2,898,409 8/1959 Tiger..............................179/100.2 Z
2,911,215 11/1959 Cousino..........................179/100.2 Z

FOREIGN PATENTS OR APPLICATIONS 1,537,240 10/1969 Germany..........................179/100.2 T

OTHER PUBLICATIONS

Automatic Tape Threading, Johnson et al., IBM Tech. Disc. Bull. Vol. 9, No. 8, Jan. 1967, pg. 968

*Primary Examiner*—Bernard Konick
*Assistant Examiner*—Robert S. Tupper
*Attorney*—Lewis H. Eslinger, Alvin Sinderbrand and Curtis, Morris and Safford

[57] ABSTRACT

A plurality of fingers which are movable longitudinally and rotatably are mounted on a video tape recorder housing. The fingers grasp the portion of magnetic tape which is between the ends of supply and take-up reels and form this portion of the tape into a loop. The loop is automatically drawn over the circumference of a record/playback head and is automatically removed therefrom without the operator touching the tape. Provision is also made to preclude the inadvertent removal of the tape during a play or record cycle.

14 Claims, 8 Drawing Figures

INVENTOR

NOBUTOSHI KIHARA

BY [signature]

ATTORNEY

INVENTOR

NOBUTOSHI KIHARA

BY

ATTORNEY

INVENTOR

NOBUTOSHI KIHARA

INVENTOR

NOBUTOSHI KIHARA

BY

ATTORNEY

INVENTOR

NOBUTOSHI KIHARA

BY

ATTORNEY

INVENTOR

NOBUTOSHI KIHARA

BY [signature]

ATTORNEY

INVENTOR

NOBUTOSHI KIHARA

BY [signature]

ATTORNEY

INVENTOR

NOBUTOSHI KIHARA

BY

ATTORNEY

WITHDRAWING A MAGNETIC RECORDING TAPE FROM A CASSETTE AND ENGAGING A LOOP FORMED IN THE TAPE WITH THE GUIDE DRUM OF A MAGNETIC RECORDING AND/OR REPRODUCING APPARATUS

Video tape recorders are well known in the art, however, they are cumbersome to use because it is so difficult to manually thread the tape through the housing of the video tape recorder and around the play/record head and back to the take up reel. This invention proposes to solve this problem by setting forth a mechanism which will automatically place the tape into the housing around the play/record head.

Video tape recorders generally include a tape, which extends continuously between a take-up and a supply reel, and is mounted in a cassette, a head having the capability of recording and playing back signals on a tape, a capstan and a pinch roller for driving the tape, a motor for driving the head and an array of electrical circuitry for controlling the latter functions.

It is, of course, advantageous to have a video tape recorder which is compact in size since it is now feasible for these devices to be handled by the ordinary consumer. The prior art was not able to provide an automatic tape threading mechanism which would be efficient in operation and would not be encumbered with a plethora of structural elements necessary to accomplish this result.

It has been discovered that by using a plurality of tape guiding members in the form of fingers which urge the tape from between the take-up and supply reels, the tape can be automatically placed around the play/record head.

Basically, the invention is utilized by placing a cassette, having a tape extending between a take-up and a supply reel, on a VTR chassis. The portion of the tape which extends between the reels is available to be grasped by a plurality of fingers.

The fingers are oriented on a spring-biased plate such that when the VTR is actuated the spring-biased plate urges the fingers in a direction away from the cassette. The center portion of the tape is pulled out of the cassette in the form of a narrow loop. By means of a rotatable knob, which can be spring-biased the fingers are spread apart thereby making the loop larger. The fingers sweep the tape around the tape head whereby the tape conforms to the outer periphery of the head.

The head is rotated by a motor means. A capstan and pinch roller in conjunction with a drive mechanism for the take-up reel serve to drive the tape. In order to remove the tape from the VTR, an arm lifts the tape from the head, whereby the tape loop is wound into the cassette and the cassette can then be removed from the housing of the VTR.

It is a principal object of this invention to provide an automatic tape guiding mechanism for a tape recorder whereby magnetic tape is automatically placed around a play/record head.

It is another object of the invention to provide an inexpensive structure which requires minimal space and which serves to automatically guide a tape into a recording mechanism.

It is yet another object of the invention to provide a tape guiding means which will guide a tape and automatically wrap the tape around the circumference of a recording and reproducing tape head.

It is still another object of the invention to provide a mechanism for automatically removing the tape from around a record/play head whereby the tape can be removed from a tape recorder without touching the tape with one's finger.

It is yet a further object of the invention to provide a plurality of rotatable fingers which form a loop in a tape and place the tape around a tape head.

Further objects and advantages of the present invention will become apparent as the following description proceeds, and the features of novelty which characterize the invention will be pointed out with particularity in the claims annexed to and forming part of this specification.

For a better understanding of the present invention, reference may be had to the accompanying drawings in which.

Figure 1:
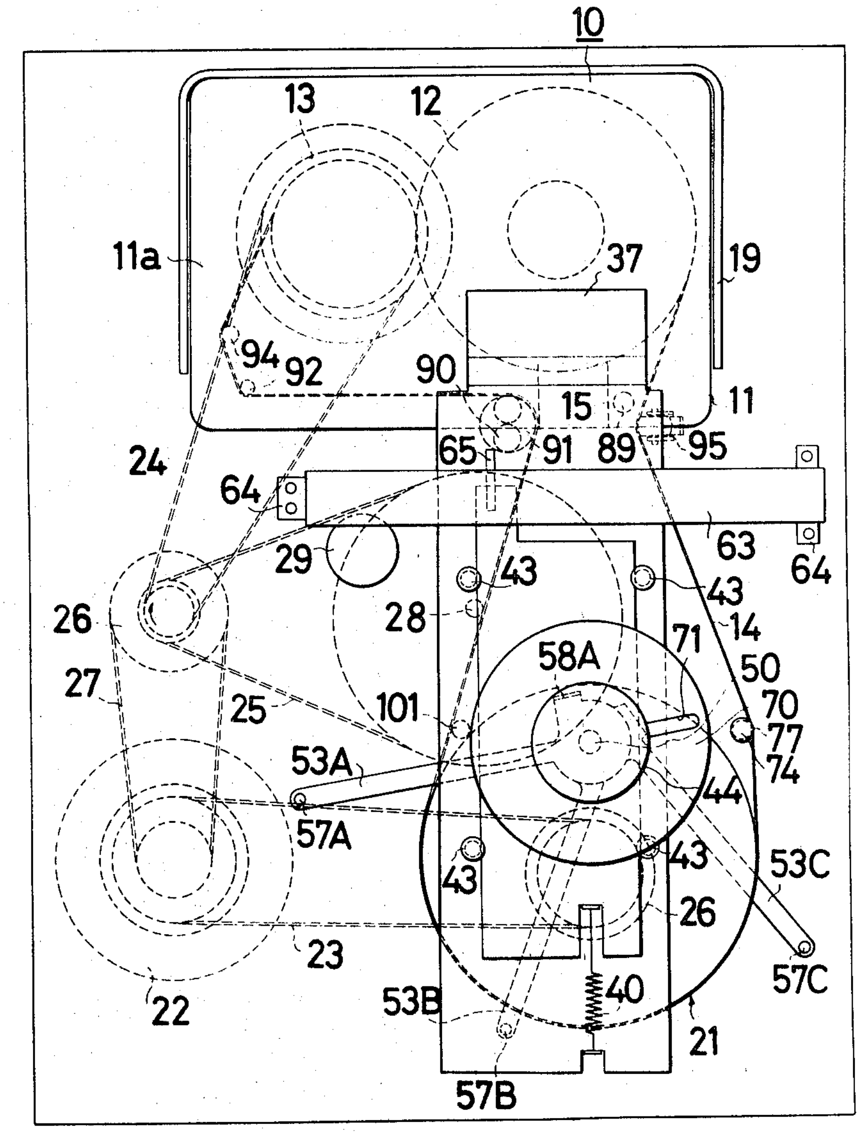
FIG. 1 is a plan view illustrating the drive mechanism and the relationship of the cassette to the chassis of a video tape recorder.

For the purpose of illustrating the present invention, a specific type of video tape recorder is disclosed. It should be understood, however, that the aspects of the present invention are applicable to the many varied tape mechanisms having a supply and a take-up reel where it is desired to form a loop in the tape. It is not intended to limit the present invention to the specific type of video tape recorder illustrated.

Referring now to the drawings, there is illustrated a video tape recorder (VTR). A tape cassette generally indicated at 10 can be inserted into the VTR mechanism. The cassette 10 is well known in the art and comprises a housing 11 which completely encases a pair of tape reels 12 and 13. Reel 13 is a take-up reel because tape 14 is wound upon it and reel 12 is a supply reel because it provides the tape to be wound upon reel 13. An opening 15 is formed in the cassette 10 which is larger than the width of the tape 14 such that a plurality of fingers, to be described hereinafter, can be inserted into the opening and withdraw the tape 14 therefrom.

A cassette holder 16 having front and rear abutments 17 and 18 respectively and side walls 19 holds, positions and prevents the cassette 10 from movement. The cassette holder 16 can be movable whereby a cassette can be placed in the holder and pivoted into the VTR mechanism or the holder can be stationary and the cassette can merely be dropped therein.

The video tape recorder chassis is shown generally at 20. Rotatably journalled with the chassis 20 is a head drum 21 in which there is provided a rotary magnetic head assembly which picks up signals from a tape or applies a signal thereto. The assembly includes an upper drum **21*a* and a lower drum 21*b*. The upper and lower drums are mounted for rotation on a shaft (not shown). Magnetic heads (not shown) are located between the upper and lower drums 21*a*, 21*b* and are fixed to the upper head. The shaft can be driven by any known motor means to rotate the drum assembly 21. As shown in FIG. 1, a motor 22 drives a series of belts 23, 24 and 25. The drum assembly 21 has a pulley 26 fixed to the shaft on which the drums are secured and the belt 23 thus drives the drum assembly. A known speed reduction mechanism 26 has a series of pulleys thereon which receives the belts 24, 25 and 27. The belt 24 drives the take-up reel 13 and the belt 25 drives a capstan 28. A pinch roller 29 having a soft, rubberized surface thereon is adapted to be moved against the tape 14 which is sandwiched between the capstan 28 and the pinch roller 29. The tape 14 is frictionally moved by the rotating capstan and the freely rotatable pinch roller which bears against the tape 14 and the capstan 28**.

The motor 22 is energized when the tape cassette 10 is placed in the holder 16. A switch 30 having electrical connectors 31 thereon is electrically connected to the motor 22. A button 32 on the switch extends through an opening 33 in the holder. Thus, when the cassette 10 is placed in the holder 16, the buttom 32 is actuated and the motor is energized.

The principal feature of this invention is to provide a mechanism which will move the section of the tape 14, which extends between the take-up and supply reels 13, 12, and wrap it around the drum assembly 21.

Figure 2:
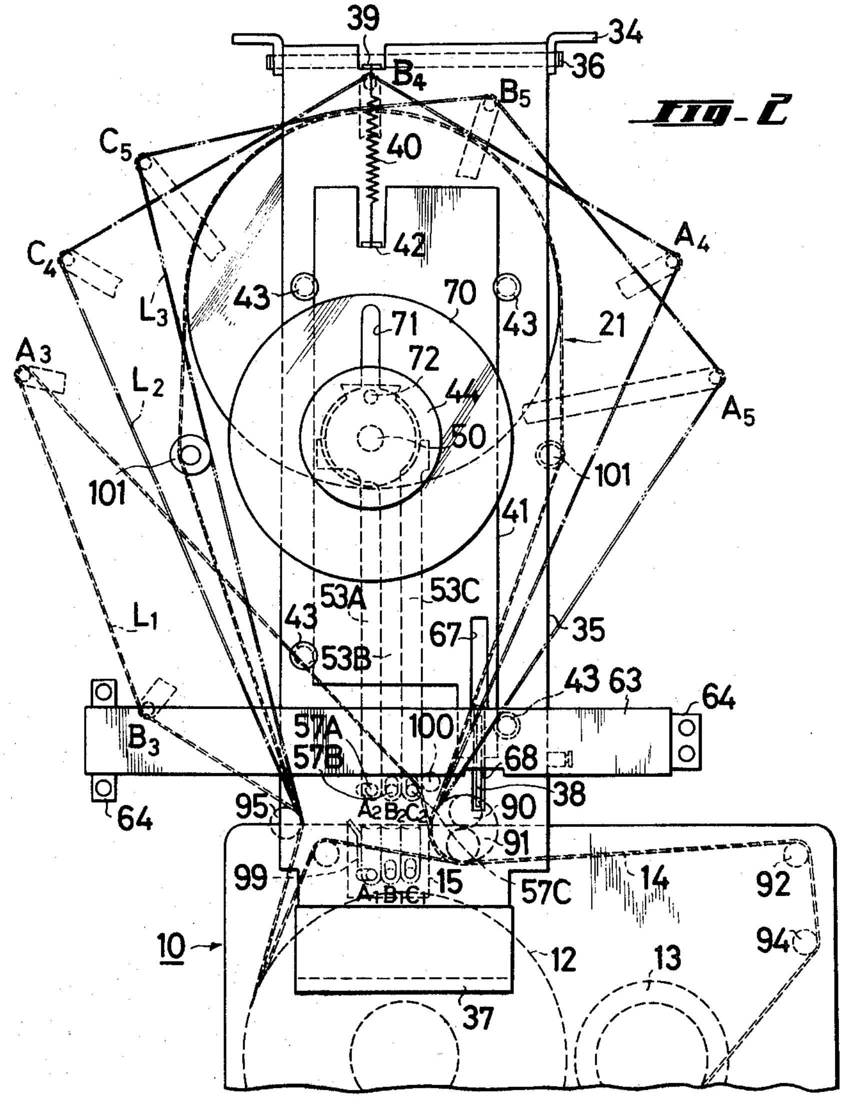
FIG. 2 is a plan view showing the movement of the retracting fingers in phantom lines and the various tape positions.
Figure 3:
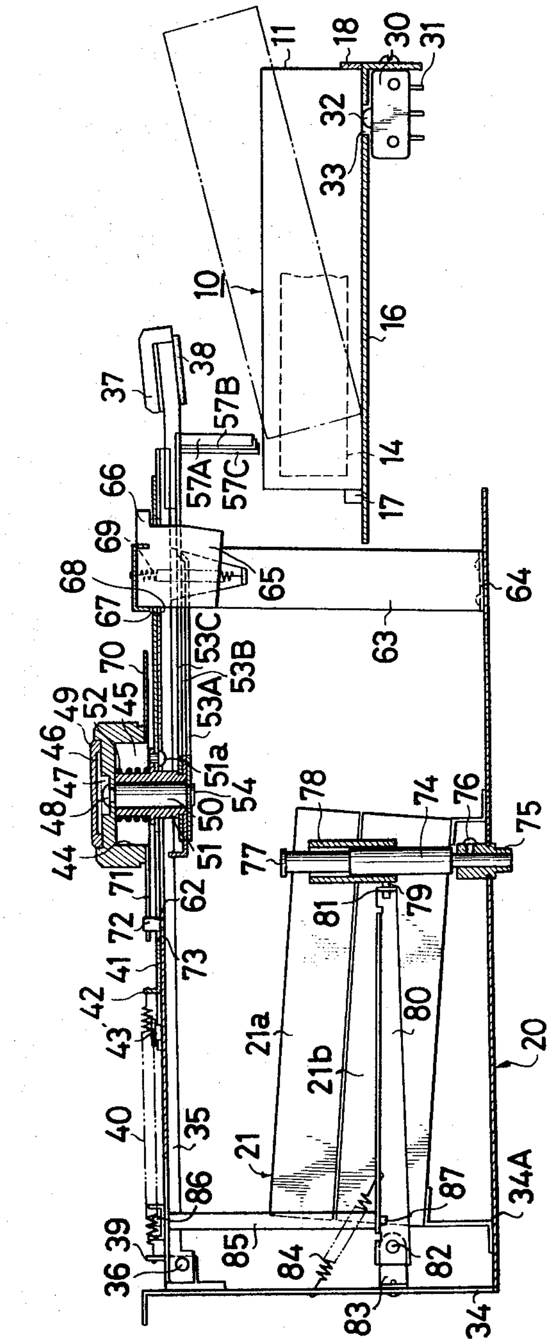
FIG. 3 is a side view, partly in section of the chassis and an illustration of the insertion of a cassette in phantom and full lines.

In FIGS. 2 and 3 there is shown a loading plate 35 which is pivotally attached by a pin 36 to an upright wall 34 on the chassis 20. Fixed to the end of the plate 35 opposite its pivoted end is a handle 37 having a soft surface 38 thereon such as plastic, rubber or felt to prevent damage to the cassette 10 when he handle is lowered, as will be fully explained hereinafter. An upstanding tab 39 is formed on the pivoted end of the loading plate 35 and a spring 40 is attached to the tab. The other end of the spring is attached to a slide plate 41 by means of an upstanding tab 42. Thus, the spring 40 biases the slide plate 41 toward the upright walls 34 of the chassis as shown in FIGS. 2 and 3. In order to insure that the plate 41 moves in a straight path, guide pins 43 are fixed to the loading plate 35 and lightly engage the sides of the slide plate 41. The number of guides used is a matter of choice, however, it has been found that two on each opposite side of the plate 41 serve to keep the plate centered on the loading plate 35 and keep it constrained to a linear path. The guide pins are formed with an enlarged head over a stub shaft as shown in FIG. 3 whereby the head extends slightly over the plate 41 thereby preventing it from being displaced upwardly away from the loading plate 35.

Figure 6:
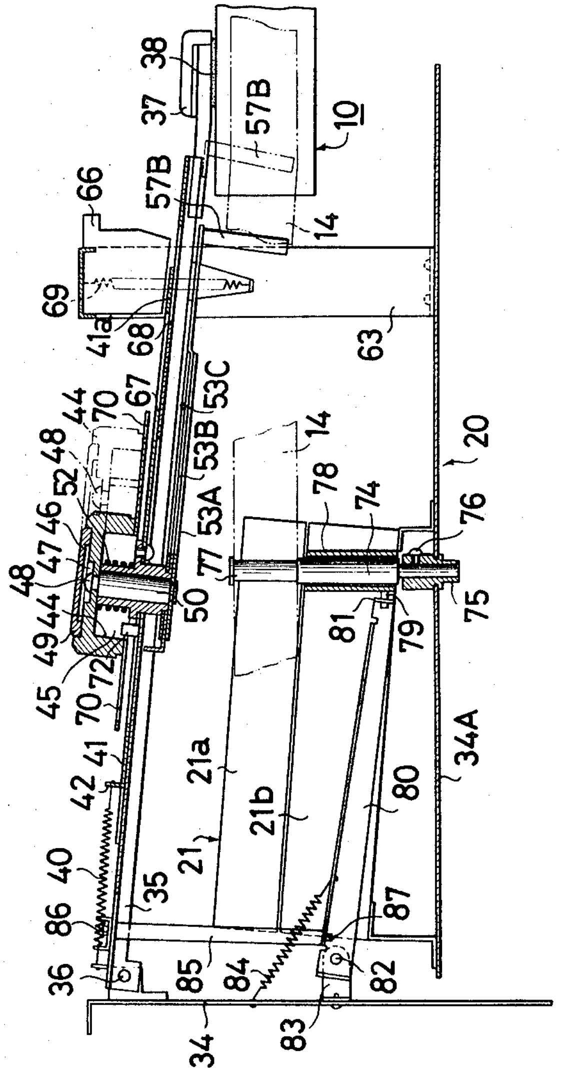
FIG. 6 is a side view of the chassis showing the retracting assembly in operative position.
Figure 7:
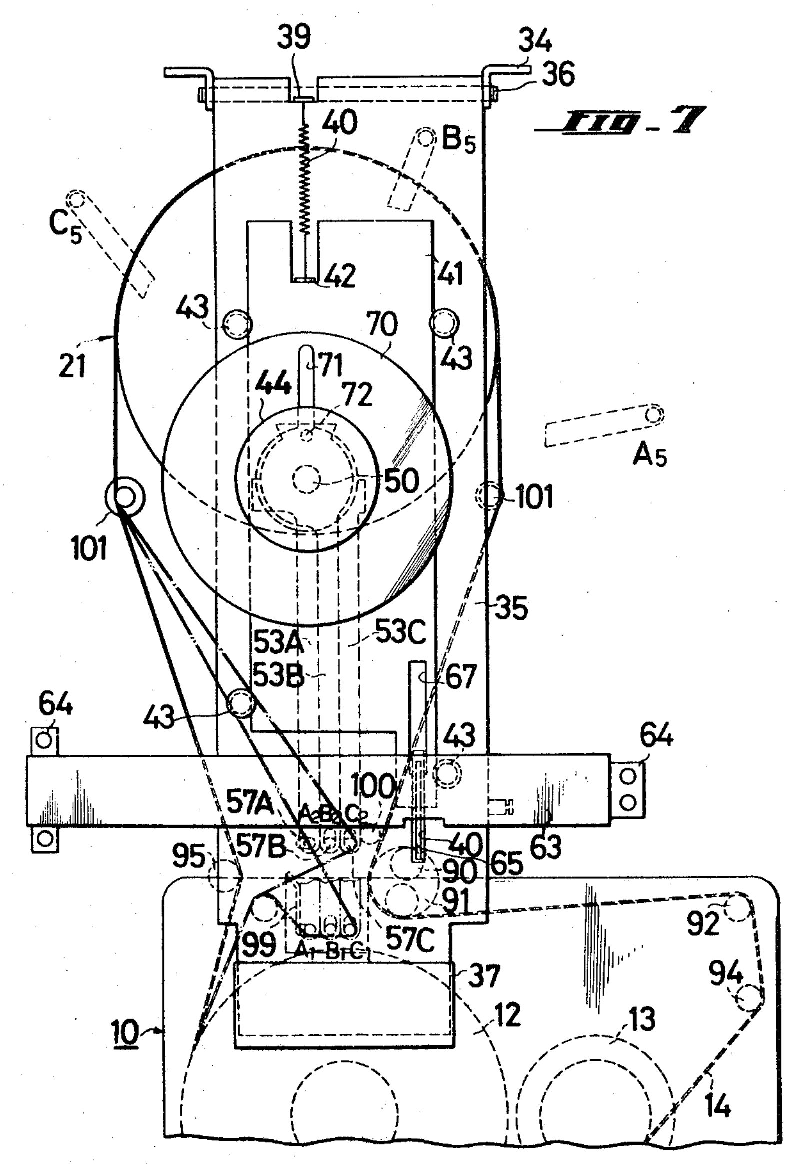
FIG. 7 is a plan view of the retracting assembly and its relationship to a cassette.
Figure 8:
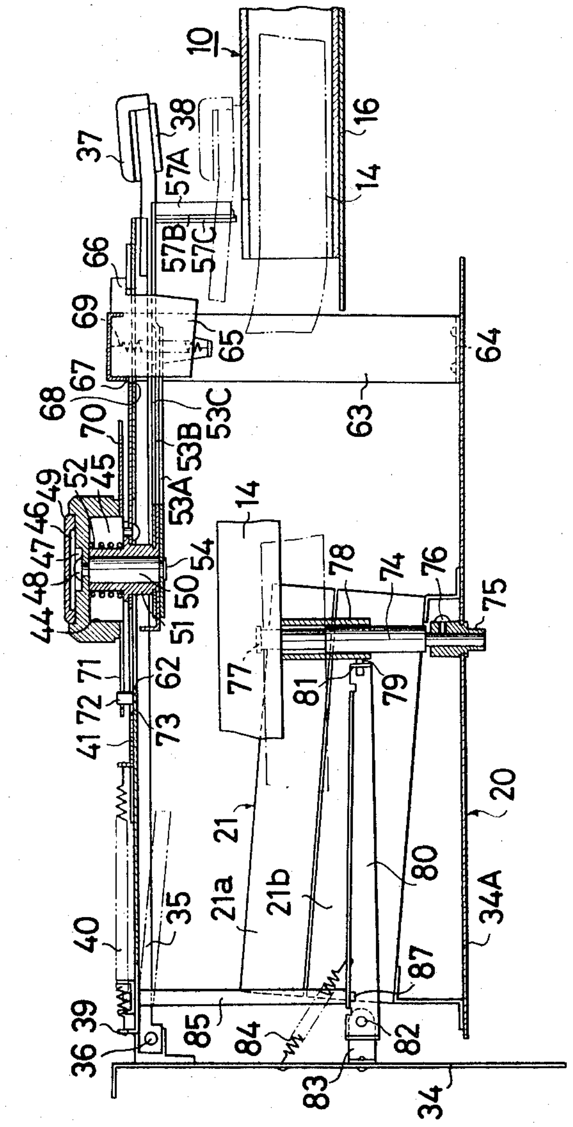
FIG. 8 is a side view of the chassis, partly in section, showing the retracting mechanism in the non-operative position.

Referring now to FIGS. 3, 6 and 8 there is shown a rotatable knob 44 having an open interior portion 45. The knob has a recess 46 and a counterbore 47 in the top portion thereof. The counterbore receives a bolt 48 and a cover 49 hides the bolt. The knob is fixed to a rotatable shaft 50 which is located within a sleeve 51. The sleeve is secured to the plate 41 by any fastening means, such as a rivet 51*a*. A coil spring 52 circumscribes the sleeve 51 and one end of the spring is attached to the stationary sleeve and the other end is fixed to the rotatable knob 44 such that the knob is biased in a clockwise direction with the shaft 50.

Figure 4:
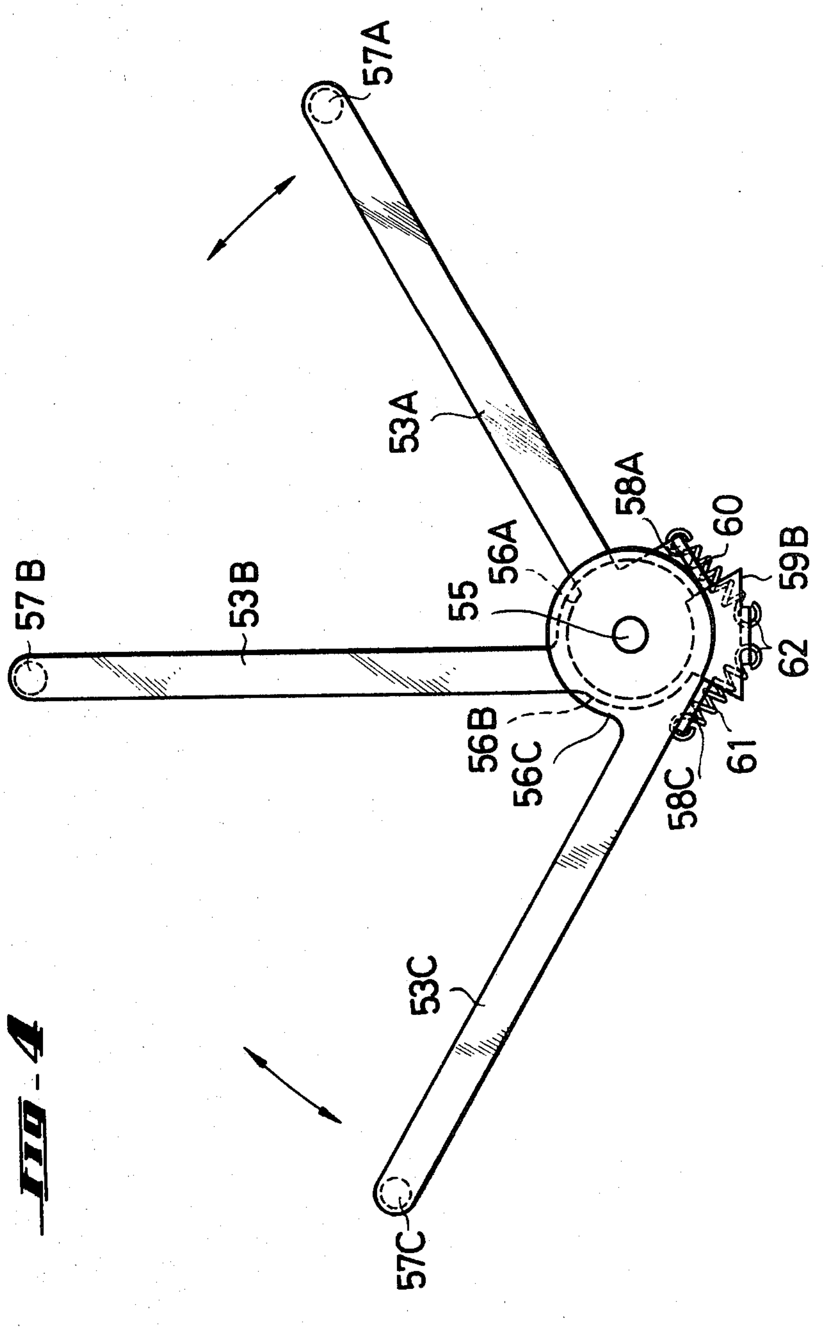
FIG. 4 is a plan view of the retracting fingers.

Three fingers 53A, 53B and 53C, shown in detail in FIG. 4 are secured to the shaft 50 by a bolt or a rivet 54 which extends through an opening 55 in an enlarged portion 56A, 56B, 56C on each finger respectively. Each finger 53A, 53B and 53C has a depending tape guiding member 57A, 57B and 57C secured thereto. An upstanding tab 58A is secured to the enlarged portion 56A of the finger 53A and an identical upstanding tab 58C is secured to the enlarged portion 56C of the finger 53C. An extension 59B formed on the enlarged portion 56B of the finger 53B is interposed between the tabs 58A and 58C and separates them. Fixed to the upstanding tabs 58A and 58C respectively are springs 60 and 61. The opposite end of the springs are secured to posts 62 on the extension 59B. Thus, the fingers 53A and 53C are biased in opposite directions towards the extension 59B and the finger 53B has no outside bias thereon and the fingers are maintained approximately 40° from each other. Any suitable angle can be chosen however. The rivet 54 secures the finger 53A to the shaft 50. The fingers 53B and 53C are freely rotatable relative to the shaft 30. Thus, when the knob 44 rotates, for example, in a clockwise direction, the shaft which is fixed to the knob and to the finger 53A rotates the finger. The upstanding tab 58A on the finger 53A abuts the extension 59B and the extension abuts against the tab 58C. Therefore, rotation of the finger 53A will cause the other fingers 53B and 53C to rotate correspondingly therewith. The purpose for inducing this rotation will be fully explained hereinafter.

Formed in the plate 35 is a guide groove 62 as shown in FIG. 3. A stanchion 63 is riveted or otherwise secured to the chassis bottom plate 34*a* by flanges 64. The stanchion is a U-shaped member in which the bight portion thereof extends beyond the width of the plates 35 and 41. A locking member 65 shown best in FIGS. 6 and 8 is secured to or formed integrally with the stanchion 63. The locking member is a plate having a protruding finger 66 thereon. A longitudinal groove 67 is formed in the slide plate 41/and the locking member extends through the longitudinal groove 67. The locking member 65 also extends through another longitudinal groove 68 formed in the loading plate 35. The groove 67 and the groove 68 are in alignment when the slide plate 41 is positioned over the load plate in a predetermined orientation.

A coil spring 69 is fixed to the stanchion 63 at its upper inner bight portion and the opposite end of the spring is fixed to the plate 35 so as to urge the plate upwardly with respect to the pin 36. Thus, since the handle 37 is fixed to the plate 35, downward pressure (as viewed in FIG. 3) on the handle will pivot the plate 35 downwardly around the pin 36.

A laterally extending flange 70 is fixed to the depending skirt on the rotatable knob 44. A longitudinal groove 71 extends from an inner portion of the flange 70 to a point near the outer periphery of the flange. A protuberance 72 is attached to the loading plate 35 and is dimensioned to extend upwardly through the longitudinal groove 71 when the plate 35 is in its uppermost position. The protuberance 72 serves as a stop to preclude rotation of the knob 44 when the plate 35 is in its uppermost position. A longitudinal groove 73 is formed in the plate 41 in alignment with the protuberance 72 to permit the protuberance to extend through the plate 41 and be guided thereby. The aforementioned structure comprises the tape withdrawal and drum winding subassembly. The following structure comprises the unloading subassembly for removing the tape 14 from the drum 21 so the cassette 10 can be removed from the chassis 20.

A shaft 74 is rigidly fixed to the chassis wall 34*a* through a sleeve 75 and a set screw 76. The shaft has a T-shaped head 77 thereon which fits over the edge of the tape 14 and helps maintain the tape in contact with the drum 21. An unloader sleeve 78 is loosely mounted on the shaft 74. A pin 79 is rigidly secured to the unloader sleeve 78 and extends outwardly at approximately a right angle thereto. The sleeve 78 is free to move along the longitudinal extent of the shaft 74. An arm 80 having a flange 81 at one end has an opening (not shown) in the flange which is dimensioned to loosely receive the pin 79. The arm 80 is free to rotate about a pin 82 which is secured to an L-shaped bracket 83 fastened to the wall 34 of the chassis 20. The arm 80 is biased in a counter-clockwise direction about the pin 82 by a spring 84 having one end connected to a wall 34 of the chassis and the other end fixed to the arm 80. A connecting rod 85 has its upper end 86 secured to the loader plate 35 and its other lower end 87 secured to the arm 80. It will now be readily understood that when the plate 35 is in the horizontal locked position shown in FIGS. 3 and 8, the arm 80, since it is connected to the plate 35 via the rod 85, is also in a horizontal position parallel to the plate 35. When the plate 35 is lowered as shown in FIG. 6, the arm 80 is rotated the same amount about the pin 82 and remains in a parallel relationship with the plate 35. It will also be seen that the sleeve 78 will move up and down along the shaft 74 since it is connected to the movable arm 80. The shaft 74 is located adjacent the drum 21 such that the sleeve 78 contacts the tape 14 and when the sleeve 78 is moved upwardly it functions to force the tape 14 out of contact and off the face of the drum.

The cassette 10 is formed of a housing, preferably of plastic, however, any material may be used. Upstanding walls 11 form the periphery of upper and lower parallel walls 11a. A take-up reel 13 and a supply reel 12 are spaced from each other and a magnetic tape 14 is fed passed the rotatable roller 92 which is held by a bracket 93 to the cassette housing wall 11a. The tape is then led passed the post 94 and is fed into the takeup roller 13. A guide roller 95 is journalled onto the chassis by means of a bracket 96 having upstanding ears 97 and a shaft 98 thereon. It should be noted that various tape guides 101 can be located in the tape path where desired to properly orient and guide the magnetic tape 14.

Figure 5:
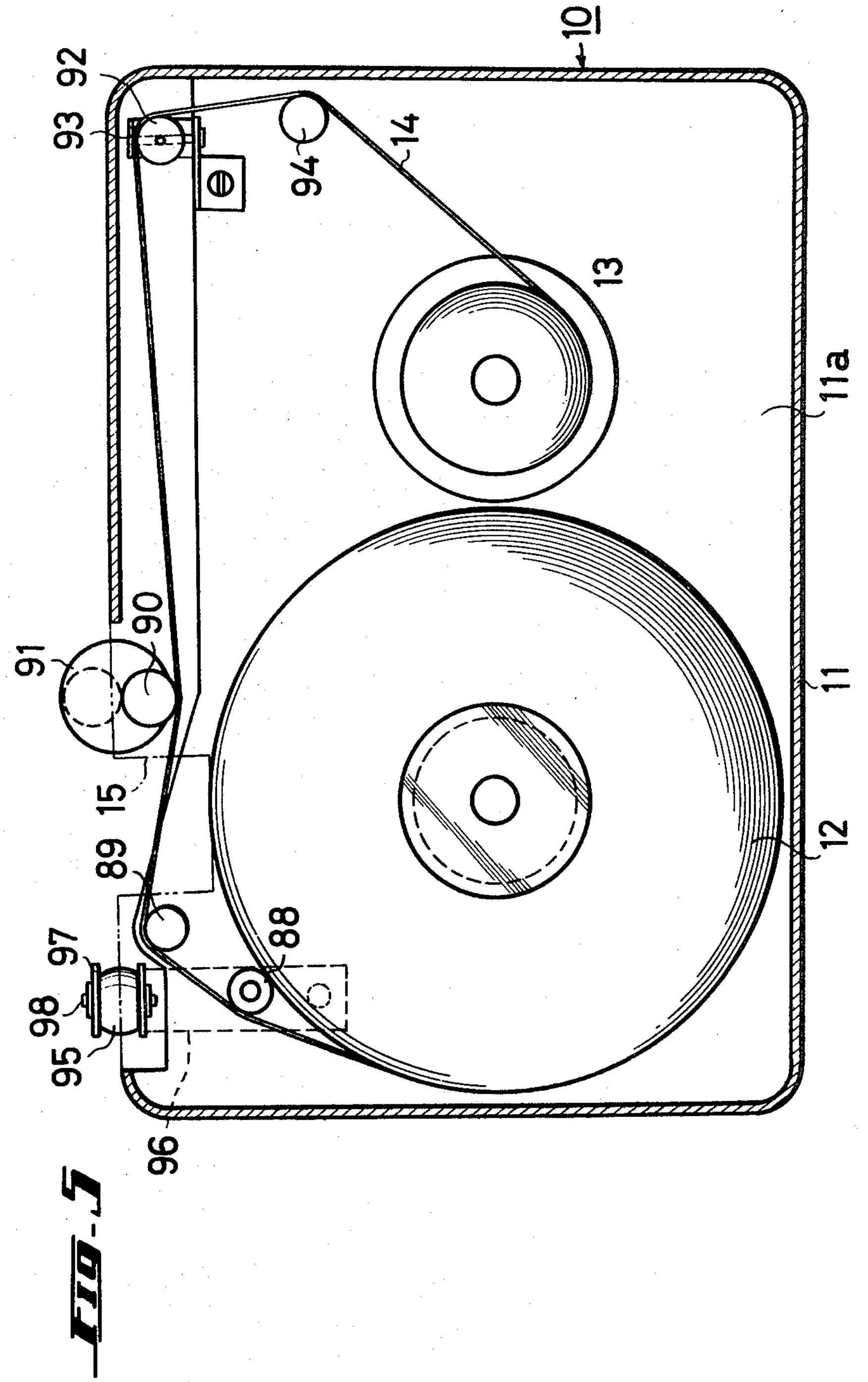
FIG. 5 is a plan view, partly in section, of a cassette cartridge.

In actual operation, the cassette 10 such as shown in FIG. 5 is taken and placed in a cassette holder 16 as shown in FIG. 3. The opening 15 is placed toward the chassis 20 and if desired the cassette holder 16 can be keyed so as to accept the cassette only in that direction.

The chassis 20 is in the "off" position as depicted in FIG. 3, i.e., the fingers 53A, 53B and 53C cannot move because the fingers are attached to the rotatable shaft 50 which is fixed to the knob 44 and the flange 70 attached to the knob 44 is prevented from rotation by the protuberance 72 on the plate 35.

The slide plate 41 cannot move because the stop plate 65 is in the groove 67 of the movable plate 41 thereby preventing the spring 40 from moving the plate 41.

Therefore, in order to energize the mechanism, the user lowers the holder 16 and the cassette 10 initially depresses the button 32 which actuates the switch 30 and sends current to the motor 22. When the play button is actuated, the motor rotates the pulleys which actuate the belts 23, 24 and 25. Thus, the take-up reel rotates and the tape 14 starts winding onto the reel 13 from the reel 12. The operator then depresses the handle 37 downwardly against the spring 69. Since the handle is connected to the loader plate 35, the latter plate pivots downwardly around the pin 36 until it reaches the position shown in FIG. 6 an in dashed lines in FIG. 8. As the loader plate 35 goes down, the knob 44 and the fingers 53A, 53B, 53C also go down. The tape guiding members 57A, 57B, 57C on the ends of the fingers 53A, 53B, 53C are positioned behind the tape 14 as shown in FIGS. 2 and 6. A guide member 99 can be used, if desired, to aid in the insertion of the fingers into the opening 15 of the cassette 10.

As the handle 37 was depressed, the groove 67 in the slide plate 41 is moved away from the stop plate 65 as shown in FIG. 6 whereby the slide plate 41, under the influence of the tensioned spring 40, moves to the left as shown in FIG. 6. The knob 44 and the fingers 53A, 53B, 53C attached thereto are also moved to the left as shown in FIG. 6 since they too are attached to the slide plate 41. The tape 14 is now pulled out of the opening 15 in the cassette 10 to the point $A_2$, $B_2$, $C_2$ as shown in FIG. 2. As the knob 44 moves to the left, the groove 71 in the flange 70, which extends through to the interior of the knob 44, passes the protuberance 72 until the protuberance is located within the open interior 45 of the knob 44. The protuberance can not prevent the rotation of the knob 44 under the influence of the coiled spring 46 and the knob now begins to rotate in a clockwise direction.

The finger 53A is fixed to the shaft 50 which is secured to the knob 44, therefore, the finger rotates in the clockwise direction and when the lug 58A strikes the abutment 59B, the finger 53B rotates which in turn strikes the lug 58C thereby rotating the finger 53C.

As the fingers rotate, they move the tape to the position L, ($A_3$, $B_3$) shown in FIG. 2 initially. As the fingers continue to rotate, the tape 14 is moved to the position $L_2$ ($A_4$, $B_4$, $C_4$) and at this point the tape 14 has formed therein its largest loop and the tape surrounds the drum 21. As the tape 14 is moved to position $L_3$ ($A_5$, $B_5$, $C_5$) the tension created between the tape guiding members 57A, 57B, 57C is lowest and the tape 14 drops under the influence of gravity and surrounds and conforms to the circumference of the drum 21. The tape guiding members 57B and 57C can be tapered to facilitate the release of the tape 14. The take-up reel initially removes the slack in the tape and the pinch roller moves the tape. An abutment 100 can be placed in the path of the slide plate 41 to limit its linear travel or any other known stop means can be employed. It can be seen in FIG. 6 that while the tape is playing or being recorded upon, the slide plate 41 has a portion 41*a* just beyond the groove 67 which abuts against the stop plate 65. Thus, the user cannot inadvertently remove the cassette 10 because the handle 37 firmly abuts against the cassette 10.

When the play or record cycle is completed and the operator desires to remove the cassette 10, he rotates the knob 44 in a counter-clockwise direction against the spring 52. The fingers 53A, 53B, 53C are arranged as shown in FIG. 2 at $A_2$, $B_2$, $C_2$. As the knob 44 is rotated in the counter-clockwise direction, the tape guide member 57C on the finger 53C bears against the tape 14. The knob 44 is then moved to the right as shown in FIG. 8. At this point the groove 67 is directly beneath the stop plate 65 and the plate can enter the spring groove. The spirnt 69 then urges the loader plate 35 and the slide plate 41 upwardly and the tension is restored to the spring 40. The protuberance 72 enters the groove 71 when the knob 44 has been completely rotated. As the loader plate 35 is raised to its horizontal position (FIG. 8) it raises the arm 80 with it to a horizontal position. The arm 80 is pinned to the sleeve 78 and as the tape 14 was located between the head 77 on the shaft 74 and the shoulder formed by the sleeve, the tape 14 is moved from this position when the sleeve 78 moves upwardly because it urges the tape out of the groove formed by the head 77 and the sleeve. The head is running, of course, when the tape is being ejected from the head and it is this movement of the head which helps the tape run off the surface of the head. The tape is thereby lifted from the drum 21 and it is pulled into the cassette 10 by the movement of the take-up reel 13. When the cassette is removed the motor stops because the circuit is broken by the In view of the detailed description included above, the operation of the video tape recorder of the present invention will readily be understood by those skilled in the art. While there has been shown and described a particular embodiment of the present invention, it will be apparent to those skilled in the art that various changes and modifications may be made without departing from the invention in its broader aspects, and it is, therefore, contemplated in the appended claims to cover all such changes and modifications as fall within the true spirit and scope of the invention.

What is claimed is:

1. An apparatus for recording and/or reproducing signals on a magnetic tape wound on reels contained in a cassette which has an opening for exposing the tape between the reels; comprising a chassis, a holder on said chassis for receiving and positioning a cassette, a tape guide drum spaced from said holder on said chassis and having at least one rotary magnetic head associated therewith for movement in a circular path corresponding to the circumference of said drum, tape guiding means for pulling out the tape from said opening of a cassette received by said holder and for forming the pulled-out tape into a loop that is disposed above the guide drum and that encompasses and is spaced outwardly from said drum, and means for releasing the tape loop from said tape guiding means so that the tape loop drops therefrom about said drum and the surface of the tape at the inside of said loop is engageable with at least a portion of said circumference of the guide drum.

2. An apparatus according to claim 1; in which said tape guiding means includes a plurality of fingers extendable into said opening of a cassette opening in a substantially planar path that is disposed above said guide drum and has an arcuate section extending around at least said portion of the circumference of said drum.

3. In a magnetic recording and/or reproducing apparatus, the combination of a chassis, means on said chassis to rotatably support take-up and supply reels having a magnetic tape wound on said reels and extending between the latter, rotary magnetic head means for recording and/or reproducing signals on said tape and being movable in a circular path spaced from said reels, a tape guide drum having its periphery coinciding with said circular path to guide the tape during said recording and/or reproducing by said head means, tape guiding means engageable from above with said tape between said reels, and means actuating said tape guiding means for withdrawing tape from said reels and forming a loop in the withdrawn tape above said guide drum and for releasing said loop from said tape guiding means so that the loop falls around said guide drum and has the inner surface of said loop in contact with at least a part of said periphery of the tape guide drum.

4. In a magnetic recording and/or reproducing apparatus, the combination according to claim 3, in which said reels are disposed in a cassette having an opening across which said tape extends between said reels, and said cassette is received in a holder on said chassis; and further comprising an electric motor for driving said rotary head means, and switch means actuable by said cassette when received in said holder to control the operation of said motor.

5. In a magnetic recording and/or reproducing apparatus, the combination according to claim 4, in which said tape guiding means comprises a plurality of fingers and means mounting said fingers for movement toward and away from each other and, as a group, toward and away from said reels, and in which said actuating means initially dispose said fingers at a starting position close to each other to engage said tape between the reels and then moves said fingers, as a group while close to each other, from between said reels and then away from each other to form the tape engaged by said fingers into said loop.

6. In a magnetic recording and/or reproducing apparatus, the combination according to claim 5, in which said fingers are movable in a plane above said drum, and said actuating means moves said fingers away from each other in arcuate paths in said plane that extend around the side of said drum remote from said reels and finally reduces the aggregate distance between said reels and circumscribing said fingers to create slack in said loop and thereby to permit the loop to fall from said fingers around said drum.

7. In a magnetic recording and/or reproducing apparatus, the combination according to claim 6, in which said reels are disposed in a cassette having an opening across which said tape extends between said reels, and said fingers, when initially disposed close to each other at said starting position, project into said opening of the cassette to engage said tape extending thereacross.

8. In a magnetic recording and/or reproducing apparatus, the combination according to claim 7, in which said means mounting the fingers includes a support plate, a slide member movable along said support plate in the direction of said movement of the fingers as a group, arms having said fingers respectively depending therefrom, and means mounting said arms rotatably with respect to said slide member so that angular displacements of said arms cause said movement of the fingers toward and away from each other.

9. In a magnetic recording and/or reproducing apparatus, the combination according to claim 8, in which said means mounting said arms rotatably with respect to said slide member includes a shaft journalled in the latter and having one of said arms secured on said shaft to rotate therewith, and the others of said arms are freely rotatable on said shaft, and in which said arms have cooperatively engageable abutment means to cause said other arms to successively follow the angular displacement of said one arm with said shaft upon the attainment of a predetermined angular spacing between the arms.

10. In a magnetic recording and/or reproducing apparatus, the combination according to claim 9, further comprising spring means connected between said arms to yieldably urge the latter to have said predetermined angular spacing therebetween, and means to hold said arms together in opposition to said spring means when said one arm is angularly disposed to place the respective finger at said starting position.

11. In a magnetic recording and/or reproducing apparatus, the combination according to claim 8, in which said means mounting said arms rotatably with respect to said slide member includes a shaft rotatably carried by said slide member and having said arms mounted on said shaft for said angular displacements relative to each other in response to turning of said shaft; and further comprising spring means urging said shaft to turn in the direction for moving said said fingers away from each other, and means permitting turning of said shaft by said spring means only when said slide member is positioned relative to said support plate to dispose said fingers, as a group, away from said reels.

12. In a magnetic recording and/or reproducing apparatus, the combination according to claim 8, further comprising spring means acting on said slide member to urge the latter relative to said support plate in the direction for moving said fingers as a group away from said starting position, and means permitting movement of said slide member by said spring means acting thereon only when said support plate is tilted to said depressed position.

13. In a magnetic recording and/or reproducing apparatus, the combination according to claim 6, further comprising guide pins engageable with said loop when the latter falls from said fingers around said drum to direct said loop in a helical path on said drum, whereby said head means scans skew tracks on the tape.

14. In a magnetic recording and/or reproducing apparatus, the combination according to claim 13, further comprising means operable to strip the tape from said drum and from said guide pins for rewinding of the tape loop onto said reels.

* * * * *